3,410,676
PLANT GROWTH REGULATOR
Kenneth L. Hill, Middleport, N.Y., assignor to FMC Corporation, New York, N.Y., a corporation of Delaware
No Drawing. Filed Feb. 8, 1965, Ser. No. 431,163
10 Claims. (Cl. 71—77)

ABSTRACT OF THE DISCLOSURE

Plant growth is regulated by compositions comprising phenylfuroxan as an essential ingredient. Examples of plant growth regulant activity include early plant maturation, breaking of bud dormancy, increased fruit size, and promotion of emergence of new axillary shoots.

---

This invention relates to a novel and effective composition and method for the regulation of plant growth, employing as an essential active ingredient the compound phenylfuroxan (sometimes also called "phenylfurazan oxide").

The structure of phenylfuroxan has not been established to the satisfaction of all workers in this field. However, the weight of authority appears to favor the formulae:

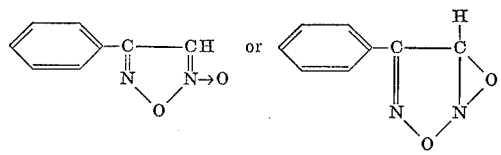

These alternative structures represent the present uncertainty as to which nitrogen atom, or across which double bond, the oxide oxygen is attached. Despite the continuing discussion as to its precise structure, phenylfuroxan is a well characterized, definite chemical compound, long known in the art. Its preparation has been reported by R. Scholl, Ber. 23, 3490 (1890); G. Ponzio, Gazz. chim. ital. 66, 114 (1936); and H. Wieland, Ann. 424, 107 (1921).

I have now discovered that the compound phenylfluroxan, when applied to plants, either growing or dormant, produces remarkably novel and unexpected plant growth regulatory effects. I have found that this compound promotes a wide spectrum and assortment of plant responses, quite untypical of known plant growth regulators. For example, phenylfuroxan induces early development of fruit, with the treated plants yielding ripe fruit much earlier than untreated plants. It also promotes early maturation of plants. When applied at an optimum growth stage, this chemical is effective as a fruit thinner; and at selected dosage levels, treatments with phenylfuroxan result in a substantial increase in the size of fruit. This compound also promotes early break of bud dormancy. Many other interesting and valuable effects on plant growth may be achieved by treatment with phenylfuroxan at the appropriate growth stage and at the concentration and mode of treatment calculated to achieve the desired growth regulatory effect. I have found that virtually all plants treated have responded in some manner to phenylfuroxan when applied during specific stages of development.

Phenylfuroxan may be prepared by the reaction of ethynylbenzene with nitrous acid, as reported by H. Wieland, Ann., 424, 107 (1921), or by the reaction of phenylglyoxime with nitrogen tetroxide as reported by G. Ponzio, Gazz. chim. ital., 66, 114 (1926). The intermediate phenylglyoxime may be prepared by the method of Ponzio and Avogadro, Gazz. chim. ital., 53, 25 (1923). These procedures are shown in the following specific examples, which are intended to be illustrative but not limitative of methods useful for the preparation of phenylfuroxan.

Example 1.—Synthesis from ethynylbenzene

To a solution of 30.0 g. of ethynylbenzene in 60 ml. of ether and 90 ml. of hexane was added an equal volume of a cold saturated aqueous solution of sodium nitrite. The mixture was maintained at 7–12° C. as 250 ml. of 4 N sulfuric acid was added dropwise over a period of four hours. The mixture was allowed to stand at this temperature for one more hour, then filtered. The solid was washed with water until all the inorganic salt (sodium sulfate) dissolved. The residual solid was washed with hexane and ether to yield 9.0 g. of phenylfuroxan melting at 109–112° C.

Example 2.—Snythesis from phenylglyoxime

A solution of 24 g. of hydroxylamine hydrochloride and 48 g. of sodium acetate in 75 ml. of water was added to a solution of 50 g. of phenylglyoxal aldoxime in 150 ml. of ethanol. The mixture was heated on a steam bath for four hours. It was then concentrated almost to dryness under vacuum and filtered. The solid was fractionally crystallized from water-ethanol to yield 12.0 g. of amphi-phenylglyoxime melting at 175–176° C. and 12.0 g. of anti-phenylglyoxime melting at 178–180° C.

Twelve grams of amphi-phenylglyoxime was dissolved in 200 ml. of anhydrous ether. The solution was cooled to 0° C. and maintained there as a slow stream of a mixture of dinitrogen tetroxide and dry nitrogen was bubbled into the stirred solution for two hours. The reaction mixture was stirred an additional two hours, then filtered. The filter cake was washed with anhydrous ether and dried to yield 8.5 g. of phenylfuroxan. The product, on recrystallization from benzene, was a white crystalline solid melting at 109–110° C.

Analysis.—Calc'd. for $C_8H_6N_2O_2$: C, 59.26; H, 3.73; N, 17.28. Found: C, 59.27; H, 4.03; N, 17.36.

The compound of this invention exhibits a wide variety of types of growth promoting activity. For example, acceleration of growth of lima beans was obtained as described in the following illustrative example:

Example 3.—Growth regulation of lima bean plants

In flat pans was placed, to a depth of three inches, a 1:1 mixture of silt loam and sandy loam soil. In the soil were then planted seeds of lima bean at a depth of approximately one inch; the flats were watered, and the seeds allowed to grow in the greenhouse for two weeks, until the first trifoliate leaf growth was expanding. Maintaining an untreated control, the stand of plants was then sprayed with a solution of phenylfuroxan in aqueous acetone, at a rate equivalent to eight pounds of toxicant per acre broadcast. Both the treated and untreated plants were held in the greenhouse while the effect of the chemical treatment was observed.

Within seven days after application of the chemical, new trifoliate leaf growth formed in the leaf axils of all treated plants. This resulted in a doubling of the trifoliate leaves on treated plants with respect to untreated plants. This growth proliferation was obtained without significant injury to the apical meristem. Normally this type of axillary leaf proliferation occurs only in plants changing from the vegetative to the reproductive state of growth or on plants in which the apical meristem has been injured or destroyed by mechanical or chemical means.

Example 4.—Growth regulation of tobacco and bean plants

Similar results were observed with tobacco plants and Black Valentine bean plants, as follows:

Following the procedure of Example 3, treatments with phenylfuroxan at rates equivalent to 4.0 and 8.0 lb./acre were employed, with each treatment being applied to four bean plants in the first trifoliate leaf stage, and to two tobacco plants 4½ inches tall with seven to ten true leaves. Initial biological responses were recorded nineteen days later, as follows:

The treated bean plants exhibited new axillary leaf growth and had three to seven trifoliate leaves per plant, whereas the control plants had two to three trifoliate leaves at this time. Subsequent observations of the treated plants showed that flower and fruit development proceeded normally.

With the tobacco plants, not only did new apical growth develop normally in the treated plants, but sucker growth developed in all the leaf axils. Control tobacco plants and treated tobacco plants were then topped, to ascertain the effect of treatment on the growth of plants mechanically induced to proliferate sucker growth. Following topping of plants, the controls initiated sucker growth at all leaf axils, whereas the treated plants did not show marked enhancement of existing sucker growth at the more basal leaf axils. All plants, including controls, established a predominant new apical growing stem from near the stem apex which tended to suppress further development of sucker growth at the more basal nodes. These new apical stems initiated flower formation following the development of several leaves. Twenty-two days after the plants were topped, one plant of both the 4.0 and 8.0 lb./acre treatments had developed well-formed flower buds at the apex of the new apical stem. The second plant of the 8.0 lb./acre treatment had initiated flower bud formation by the thirty-third day and the second plant of the 4.0 lb./acre treatment by the fortieth day. Control plants initiated bud formation on the forty-eighth and fifty-fourth days respectively. All plants flowered and set seed pods normally.

Example 5.—Effect on blossoming of tobacco plants

The interesting effect of varying the dosage of phenylfuroxan was demonstrated as follows: The phenylfuroxan, in aqueous-acetone solution, was applied as a foliar spray to tobacco plants at rates equivalent to 0.5, 1.0, and 2.0 lb./acre broadcast. At the time of application the plants were three to four inches tall with nine to ten leaves, and were set in four-inch pots. Two plants per treatment were employed. The following results were observed:

Sucker growth was initiated by the second day at all treatment levels. Although new sucker leaf growth developed to a point where distinct leaf shape was evident they failed to show further appreciable development. The apical growth of plants continued to develop. The 2.0 lb./acre treatment induced slight necrotic spotting of the more mature leaves present at time of treatment. The lower treatment levels showed no apparent phytotoxicity. The 0.5 lb./acre treatment promoted an initial increase in height growth, while the higher treatment levels, in general inhibited height growth.

Twenty-nine days after treatment the plants were transferred to larger pots. On the thirty-fifth day after treatment, both plants which received the 0.5 lb./acre treatment of phenylfuroxan possessed well-developed flower buds. By the fortieth day, one plant which received a 2.0 lb./acre treatment had initiated bud formation. By the forty-seventh day, the second plant which had received a 2.0 lb./acre treatment of phenylfuroxan had initiated bud formation. One of the plants which had received the 1.0 lb./acre treatment had also developed bud formation at this time. Descriptions of all plants at this time are presented in Table 1 below:

TABLE 1.—RESPONSE OF TOBACCO PLANTS TO FOLIAR TREATMENTS

| | State of plants 47 days after treatment | | |
|---|---|---|---|
| | Plant Height (in.) | Flower Buds Present | Plants in Bloom |
| 0.5 lb./acre: | | | |
| Rep I | 29 | Yes | Yes. |
| Rep II | 30 | Yes | Yes. |
| 1.0 lb./acre: | | | |
| Rep I | 19 | No | No. |
| Rep II | 21 | Yes | No. |
| 2.0 lb./acre: | | | |
| Rep I | 24 | Yes | No. |
| Rep II | 27.5 | Yes | Buds opening. |
| Control: | | | |
| Rep I | 22 | No | No. |
| Rep II | 20 | No | No. |

Both control plants initiated bud formation on the fifty-fourth day, seven days after the observations recorded in Table 1.

Example 6.—Growth regulation of strawberry plants

Phenylfuroxan, in acetone solution as in Example 3, was applied to strawberry plants (variety Sparkle) which were in an early flower bud stage, at rates of 0.25, 0.5, and 1.0 lb./acre. The treated plants in general initiated flower formation and subsequent fruit development significantly faster than untreated plants.

Example 7.—Growth regulation of tomatoes

An acetone-water solution containing 138 p.p.m. of phenylfuroxan was applied to twelve individually potted tomato plants (California variety 145–B) which were three and one-half inches tall and had seven to eight true leaves at time of treatments. Minute flower buds were barely visible on all plants.

Assessment of chemical activity toward the plants was first made one month after treatment. The chemical treatment did not promote any apparent phytotoxicity toward plants, but the application of phenylfuroxan actually retarded the development of floral structures. The total number of clusters as well as the total number of fruit plus blossoms present on the plants was comparable for both control and treated plants; however, control plants had 46% more measurable fruit (greater than 5 mm. in diameter) than treated plants.

A second application of 138 p.p.m. of phenylfuroxan was then applied to the previously treated plants, one month after the first treatment. Twenty-six days later the plants were assessed for fruit development. The second application now greatly enhanced fruit development and the treated plants possessed 23% more measurable fruit than the control plants. Five of the treated plants had measurable fruit on the third and fourth clusters, whereas none of the control plants had measurable fruit past the second formed cluster. These results illustrate the effect of time of application, as well as dosage, on the type of regulatory effects obtained.

Example 8.—Effect of growth stage at time of application

Another study was conducted to assess the effect of phenylfuroxan toward tomato plants in various stages of growth.

Tomatoes (variety Bonny Best) were seeded in clay pots and, after the plants had emerged, the seedlings were thinned so that each pot contained only one plant. The plantings were staggered so that at the time of treatment five plant growth stages were available. A description of these growth stages is given in Table 2 below. Aqueous acetone solutions of phenylfuroxan containing 0.1% of the wetting agent "Tween 20" (polyoxyethylene sorbitan monolaurate) and 5.0 p.p.m. and 50.0 p.p.m. active ingredient, respectively, were applied employing a spray volume of 100 gallons per acre broadcast. For each growth stage, two plants were employed for each treatment and two plants which had been sprayed with a 0.1% solution of "Tween 20" in aqueous acetone were maintained as controls. The plants were isolated as single treatment groups in the greenhouse and assessment of plant responses was made fifty days after the chemical treatments. The results are shown in Table 2 below, and represent the total number of clusters, total number of weighable fruit, and total fruit weight, for each group of two plants.

TABLE 2.—EFFECT ON FRUIT DEVELOPMENT OF TOMATO PLANTS

| Dosage | Total Number Clusters | Total Number Weighable Fruit [2] | Total Fruit Weight (g.) |
| --- | --- | --- | --- |
| Growth Stage (1):[1] | | | |
| 5.0 p.p.m. | 12 | 2 | 3.7 |
| 50.0 p.p.m. | 14 | 5 | 11.3 |
| Control | 14 | 0 | 0.0 |
| Growth Stage (2):[1] | | | |
| 5.0 p.p.m. | 15 | 1 | 0.7 |
| 50.0 p.p.m. | 17 | 3 | 24.2 |
| Control | 12 | 1 | 8.5 |
| Growth Stage (3):[1] | | | |
| 5.0 p.p.m. | 18 | 10 | 270.5 |
| 50.0 p.p.m. | 16 | 5 | 75.3 |
| Control | 15 | 1 | 22.2 |
| Growth Stage (4):[1] | | | |
| 5.0 p.p.m. | 17 | 10 | 300.9 |
| 50.0 p.p.m. | 10 | 11 | 303.2 |
| Control | 11 | 7 | 261.1 |
| Growth Stage (5):[1] | | | |
| 5.0 p.p.m. | 11 | 10 | 400.4 |
| 50.0 p.p.m. | 12 | 9 | 302.2 |
| Control | 10 | 8 | 435.5 |

[1] Growth stage:

| Description | Age from Seed |
| --- | --- |
| (1) Expanding cotyledons | One week. |
| (2) Two true leaves (1 to 1¼ inches long) | Two weeks. |
| (3) Three to four true leaves (third and fourth leaves ¾ to 1¼ inches long) | Three weeks. |
| (4) Five to six true leaves | Four weeks. |
| (5) Seven to eight true leaves; minute buds of first cluster barely visible. | Five weeks. |

[2] Fruits greater than 5 mm. in cross diameter.

The results presented in Table 2 show that fruit development is enhanced to the largest extent when phenylfuroxan is applied at growth stages (1), (3) and (4), with a lesser effect at growth stages (2) and (5). In general, however, the treated plants were morphologically advanced over the untreated controls, demonstrating that phenylfuroxan promoted the early maturation of tomatoes. Optimum treatments with phenylfuroxan not only increased the number of fruit but also appreciably increased the size of the fruit.

Example 9.—Break of bud dormancy of apple trees

In the course of a growing season, apple trees produce new vegetative buds and fruit buds during the months of July and August. These buds remain dormant or undeveloped until the following spring. In order to initiate break of bud dormancy and subsequent development of new growth, the trees must be subjected to a certain period of cold temperature. The length of this period varies with the variety of apple, but in general an exposure of at least two months to temperatures which average below 48° F. is required. If the trees do not receive the necessary amount of chilling, they tend to come into leaf slowly and blossom irregularly, or they may exhibit no growth at all. This example illustrates the use of phenylfuroxan to initiate the break of bud dormancy in apple trees which have not been subjected to cold temperatures.

Small apple trees (variety McIntosh), two to three years old, were obtained from the field in October before the onset of a prolonged period of low temperatures. The trees were planted in pots and maintained in the greenhouse at temperatures above 60° F. throughout the winter season. In late April the foliage and stems of the trees were sprayed with aqueous acetone solutions of phenylfuroxan containing 0.1% of "Tween 20" as a wetting agent and 5.0 and 50.0 p.p.m. of active ingredient, respectively. At the time of treatment the trees, which averaged twenty-six inches in height with a stem diameter of 0.5 inch at the ground line, still retained foliage from the previous season and possessed dormant vegetative buds. Two trees were employed for each concentration and two trees, sprayed with a 0.1% aqueous acetone solution of "Tween 20," were maintained as controls. Results are shown in Table 3:

TABLE 3.—EFFECT ON DORMANCY OF APPLE TREES

Dosage:              Time from treatment to new growth
  5.0 p.p.m.—
    Rep I _____ 7 weeks.
    Rep II _____ 7 weeks.
  50.0—
    Rep I _____ 5 weeks.
    Rep II _____ 5 weeks—blossoms.
  Control—
    Rep I _____ No new growth after 6 months.
    Rep II _____ Do.

The results shown in Table 3 indicate that apple culture can be carried on in climates heretofore unsuitable.

Example 10.—Fruit-thinning and fruit size enhancement

The effect of phenylfuroxan as a thinning agent and to enhance fruit size is illustrated for cherries and for peaches. The following results again demonstrate that various plant species may be somewhat differently affected by the dosage and timing of treatment, although the general existence of the growth regulating attributes of phenylfuroxan are of course apparent.

A 1% solution of phenylfuroxan in a 1:1 mixture of ethanol and "Carbowax 1500" (polyethylene glycol of molecular weight between 500 and 600) was utilized to form solutions which contained 50.0 p.p.m. and 500.0 p.p.m. of phenylfuroxan. These solutions were sprayed on selected branches of twenty-four year old Windsor cherry trees which were in full bloom. Separate trees were employed for each concentration with replicate treatments being applied to a branch or group of branches on opposite sides of the same tree. Branches of a third tree were sprayed with a blank to determine the solvent effect.

Within ten days after treatment the 500 p.p.m. treatment had caused significant abortion of the fruit resulting in an overall fruit thinning of 50%, as determined five weeks after treatment. In contrast, the 50 p.p.m. treatment caused no fruit thinning and the fruit on the branches receiving this treatment ripened faster and the cherries obtained were about 20% larger than those on the untreated control branches. Details are shown in Table 4, the results shown being the average of two replicates, forty-five days after treatment.

TABLE 4.—EFFECT OF CHERRY TREE TREATMENT ON FRUIT SET AND SIZE

| Dosage | Initial Blossom Count | Final Fruit Count | Percent Fruit Set | Total Fruit Weight (g.) | Weight per Fruit (g.) |
| --- | --- | --- | --- | --- | --- |
| 50.0 p.p.m. | 1,823 | 980 | 53 | 2,041 | 2.10 |
| 500.0 p.p.m. | 1,869 | 525 | 28 | 921 | 1.75 |
| Blank | 1,844 | 884 | 48 | 1,616 | 1.83 |

Similar results were obtained with Hale Haven peach trees. Essentially complete thinning was obtained on branches treated with a solution containing 500 p.p.m. of phenylfuroxan at complete shuck fall, whereas treatments containing 50 p.p.m. applied at complete shuck fall or eight days after complete shuck fall stimulated size increase in the fruit of 18–23%, without accompanying fruit thinning.

Systemic activity of phenylfuroxan was demonstrated in the observation of peach trees having treated and untreated branches, where the untreated branches were shielded against spray drift. Branches close to those receiving the 500 p.p.m. treatment were not thinned at all but developed 23% larger fruit than those on distal branches.

There are many interesting and economically important uses of the plant growth regulator described herein, in addition to those specifically illustrated above. This group of representative tests of various plant species illustrates some of the ways in which phenylfuroxan alters or enhances the normal development of plants. It is indicated that applications of this chemical promote enhanced development at any of several growth stages of the plant, with optimum treatment levels dependent on the particular growth stage of the plant as well as the species and variety of plant under study. Multiple treatments of plants offer other possibilities for plant growth regulation; for example, chemicals may be applied at early growth stages to induce early blossom formation, and second applications at the time plants are in bloom would further enhance fruit development. Both retardation and acceleration of plant growth and maturation may be achieved. The natural dormancy of not only fruit trees but also potato tubers and ornamental bulbs and corms, for example, may be broken by application of phenylfuroxan. Early fruit, flowers, and vegetables may be obtained, and the seasonal yield may be increased. Mechanical harvesting may be facilitated by controlled ripening. Horticultural as well as agronomic crops may be benefited. In grafting, the rate of take, and its success, may be improved. The shape of ornamental species may be enhanced, by promoting emergence of axillary shoots. A variety of other applications will be apparent to those versed in the agronomic arts.

For all applications, an effective amount and concentration of phenylfuroxan to achieve the desired result should of course be used, with due attention to the growth stage of application. Single or multiple applications may be made, for the same or different purposes, to the same plant.

Application of phenylfuroxan may be made employing the procedures normally used for treatment of plants, including dip or soak treatments of tubers, bulbs, or cuttings, for example, as well as foliar, bark or stem, or soil application. The active ingredient may be utilized in diverse formulations, including the adjuvants and carriers normally employed for facilitating the dispersion of active ingredients for agricultural applications, recognizing the known fact that the formulation and mode of application of a chemical agent may affect its activity in any given application. Thus, phenylfuroxan may be formulated as a solution or dispersion, in aqueous or non-aqueous medium, as a powdery dust, as a wettable powder, as an emulsifiable concentrate, as a granule, or as any of several other known types of formulations, depending on the desired mode of application. These growth regulatory compositions may be applied as sprays, dips, dusts, or granules, in the situs in which growth regulation is desired. These formulations may contain as little as 0.0005% or as much as 95% or more by weight of active ingredient, and applications may be at rates equivalent to less than one-half to over 200 pounds per acre.

Dusts are admixtures of the active ingredient with finely divided solids such as talc, attapulgite clay, kieselguhr, and other organic and inorganic solids which act as dispersants and carriers for the toxicant; these finely divided solids have an average particle size of less than about 50 microns. A typical dust formulation, useful herein, is one containing 1.0 part of phenylfuroxan and 99.0 parts of talc.

Wettable powders are in the form of finely divided particles which disperse readily in water or other dispersant. The wettable powder is ultimately applied to the plant either as a dry dust or as an emulsion in water or other liquid. Typical carriers for wettable powders include fuller's earth, kaolin clays, silicas, and other highly absorbent, readily wet inorganic diluents. Wettable powders normally are prepared to contain about 5–80% of active ingredient, depending on the absorbency of the carrier, and usually also contain a small amount of a wetting, dispersing, or emulsifying agent to facilitate dispersion. For example, a useful wettable powder formulation contains 20.8 parts of phenylfuroxan, 77.9 parts of palmetto clay, and 1.0 part of sodium lignosulfonate and 0.3 part of sulfonated aliphatic polyester as wetting agents.

Other useful formulations for plant applications are the emulsifiable concentrates, which are homogeneous liquid or paste compositions which are dispersible in water or other dispersant, and may consist entirely of phenylfuroxan with a liquid or solid emulsifying agent, or may also contain a liquid carrier, such as xylene, heavy aromatic naphthas, isophorone, and other non-volatile organic solvents. For plant application these concentrates are dispersed in water or other liquid carrier, and normally applied as a spray to the area to be treated. The percentage by weight of the essential active ingredient may vary according to the manner in which the composition is to be applied, but in general, comprises 0.0005% to 95% of active ingredient.

Typical wetting, dispersing, or emulsifying agents used in agricultural formulations include, for example, the alkyl and alkylaryl sulfonates and sulfates and their sodium salts; polyethylene oxides; sulfonated oils; fatty acid esters of polyhydric alcohols; and other types of surface active agents, many of which are available in commerce. The surface active agent, when used, normally comprises from 1% to 15% by weight of the composition.

Other useful formulations include simple solutions of the active ingredient in a dispersant in which it is completely soluble at the desired concentration, such as acetone or other organic solvents. Granular formulations, wherein the chemical agent is carried on relatively coarse particles, are of particular utility for aerial distribution or for penetration of cover crop canopy. Pressurized sprays, typically aerosols wherein the active ingredient is dispersed in finely divided form as a result of vaporization of a low boiling dispersant solvent carrier such as the freons, may also be used.

Of course the formulation, concentration, and mode of application of phenylfuroxan will be adapted to the particular plant and surrounding circumstances, as is the case in all agronomic applications.

The active growth regulatory compound of this invention may be formulated and/or applied with other agricultural chemicals, such as insecticides, fungicides, nematocides, fertilizers, and the like. In addition, combinations of phenylfuroxan with certain plant hormones, such as native auxins, anti-auxins, giberellins, and kinins, may produce enhanced growth regulatory effects. For example, combinations of phenylfuroxan with indole-3-acetic acid produced enhanced corn coleoptile growth over that of either chemical alone. Other useful combinations, for specific purposes, may be employed. It is apparent that modifications may be made in the formulation and application of the novel growth regulatory agent of this invention, without departing from the inventive concept herein. As will be apparent from the preceding description, use of the words "plant" and "plant growth" in the following claims refers to dormant as well as actively growing plants, and to roots, tubers, bulbs, seeds, cuttings, and the like; i.e., to plants in any stage and manifestation of growth.

I claim:

1. Plant growth regulator composition comprising, as an essential active ingredient, an effective amount of phenylfuroxan, in admixture with an inert carrier and a surface active agent.

2. Plant growth regulator composition comprising as an essential active ingredient 0.0005% to 95% by weight of phenylfuroxan, an inert carrier therefor, and a surface active agent.

3. Plant growth regulator composition comprising as an essential active ingredient 0.0005% to 95% by weight of phenylfuroxan, an inert liquid carrier therefor, and a surface active agent.

4. Method of treating plants which comprises applying a plant growth regulating amount of phenylfuroxan to the situs of the plant.

5. Method of accelerating plant growth which comprises applying an effective amount of phenylfuroxan to the situs of the plant.

6. Method of breaking plant bud dormancy which comprises applying an effective amount of phenylfuroxan to the situs of the plant.

7. Method of thinning fruit which comprises applying an effective amount of phenylfuroxan to the situs of the plant.

8. Method of enhancing fruit size which comprises applying an effective amount of phenylfuroxan to the situs of the plant.

9. Method of accelerating plant maturation which comprises applying an effective amount of phenylfuroxan to the situs of the plant.

10. Method of promoting the emergence of axillary shoots which comprises applying an effective amount of phenylfuroxan to the situs of the plant.

References Cited

UNITED STATES PATENTS

| | | | |
|---|---|---|---|
| 2,129,598 | 9/1938 | Zimmerman et al | 71—2.5 |
| 2,860,043 | 11/1958 | Bluestone | 71—2.5 |
| 3,203,959 | 8/1965 | Huffman | 71—2.5 |

OTHER REFERENCES

Kaufman et al.: The Furoxans, Chemical Reviews 59, QD1 A563 pp. 429–437 and 455.

LEWIS GOTTS, *Primary Examiner.*

G. HOLLRAH, *Assistant Examiner.*